US008862482B2

(12) United States Patent
Lakshmanan et al.

(10) Patent No.: US 8,862,482 B2
(45) Date of Patent: Oct. 14, 2014

(54) MANAGING CONNECTIONS BETWEEN REAL WORLD AND VIRTUAL WORLD COMMUNITIES

(75) Inventors: Geetika T. Lakshmanan, Cambridge, MA (US); Martin A. Oberhofer, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 1131 days.

(21) Appl. No.: 12/576,606

(22) Filed: Oct. 9, 2009

(65) Prior Publication Data

US 2011/0087968 A1 Apr. 14, 2011

(51) Int. Cl.
G06Q 10/10 (2012.01)
G06Q 30/02 (2012.01)
G06Q 10/06 (2012.01)
G06Q 10/08 (2012.01)

(52) U.S. Cl.
CPC .................................... *G06Q 10/10* (2013.01)
USPC ........................................... 705/1.1; 705/319

(58) Field of Classification Search
CPC ................................................... G06Q 50/01
See application file for complete search history.

(56) References Cited

U.S. PATENT DOCUMENTS

| 6,581,096 | B1 | 6/2003 | Cottrille et al. |
| 7,200,674 | B2 | 4/2007 | Sapuram et al. |
| 2008/0117861 | A1 | 5/2008 | Balandina et al. |
| 2008/0120558 | A1* | 5/2008 | Nathan et al. ................. 715/764 |
| 2008/0207329 | A1 | 8/2008 | Wallace et al. |
| 2008/0302867 | A1* | 12/2008 | Holberg ........................ 235/375 |
| 2008/0320131 | A1* | 12/2008 | Chalmers et al. ............. 709/224 |
| 2009/0138355 | A1* | 5/2009 | Jung et al. ........................ 705/14 |
| 2009/0158151 | A1 | 6/2009 | Cheng et al. |
| 2009/0158200 | A1 | 6/2009 | Palahnuk et al. |
| 2009/0183071 | A1 | 7/2009 | Smith et al. |
| 2009/0254358 | A1* | 10/2009 | Li et al. .............................. 705/1 |
| 2009/0286598 | A1* | 11/2009 | Do et al. .......................... 463/31 |
| 2009/0327484 | A1* | 12/2009 | Chen et al. .................... 709/224 |

(Continued)

FOREIGN PATENT DOCUMENTS

JP 2005157586 6/2005

OTHER PUBLICATIONS

Non-Final Rejection dated Dec. 1, 2011 for U.S. Appl. No. 12/576,633.
Goggins, et al., "Cooperation and Groupness: Community Formation in Small Onlline Collaborative Groups," ACM Digital Lib; pp. 207-215; 2007.

(Continued)

*Primary Examiner* — Jonathan Ouellette
(74) *Attorney, Agent, or Firm* — Thomas Grzesik; Fleit Gibbons Gutman Bongini & Bianco PL

(57) ABSTRACT

A method, information processing system, and computer program storage product manage connections between a virtual world and a social network. A set of virtual world information and a set of social network information are analyzed. A graph including a plurality of vertices is generated. Each vertex represents one of virtual world information and social network information. Each vertex is coupled to at least one other vertex by a respective edge. At least one edge of the graph couples a first vertex representing virtual world information and a second vertex representing social network information. At least one vertex is determined to be an articulation point having a respective edge. The removal of the respective edge of the articulation point causes a disconnection of the virtual world information from the social network information within the graph. A user is notified via a graphical user interface that the graph comprises the articulation point.

22 Claims, 12 Drawing Sheets

(56) References Cited

U.S. PATENT DOCUMENTS

2010/0146118 A1* 6/2010 Wie ............................ 709/225
2010/0241698 A1* 9/2010 Hillerbrand ................. 709/203
2010/0325107 A1* 12/2010 Kenton et al. ............... 707/723
2011/0087732 A1 4/2011 Lakshmanan et al.
2011/0213974 A1* 9/2011 Ardon et al. ................. 713/169

OTHER PUBLICATIONS

Edwards, W.K., "Putting Computing in Context: An Infrastructure to Support Extensible Context-Enhanced Collaborative Applications," ACM; pp. 446-456; 2005.
Final Rejection dated Apr. 17, 2012 for U.S. Appl. No. 12/576,633.

* cited by examiner

MANAGING CONNECTIONS BETWEEN REAL WORLD AND VIRTUAL WORLD COMMUNITIES

FIELD OF THE INVENTION

The present invention generally relates to virtual worlds and social collaboration platforms, and more particularly relates to linking associations within the virtual worlds and social collaboration platforms and managing the connections associated therewith.

BACKGROUND OF THE INVENTION

As of today, virtual worlds such as Second Life are generally not integrated with social collaboration platforms such as Lotus Quickr, MySpace, developer forums, etc. Many individuals have accounts with a virtual world and social collaboration platforms. However, conventional technology generally does not provide any management tools for connecting a user's virtual world accounts with his/her social collaboration platforms and efficiently managing these connections.

SUMMARY OF THE INVENTION

In one embodiment, a method for managing connections between a virtual world and a social collaboration platform is disclosed. The method comprises analyzing a set of virtual world information associated with a virtual world and a set of social network information associated with a social network. A graph comprising a plurality of vertices is generated based on the analyzing. Each vertex represents a respective one of virtual world information in the set of virtual world information and social network information in the set of social network information. Each vertex is coupled to at least one other vertex by a respective edge. At least one edge of the graph couples a first vertex representing virtual world information and a second vertex representing social network information, thereby connecting the virtual world information to the social network information. At least one vertex in the plurality of vertices is determined to be an articulation point having a respective edge. The removal of the respective edge of the articulation point causes disconnection of the virtual world information from the social network information within the graph. A user associated with at least one of the virtual world information and the social network information is notified via a graphical user interface that the graph comprises the articulation point.

In another embodiment, an information processing system for managing connections between a virtual world and a social collaboration platform is disclosed. The information processing system includes a memory and a processor that is communicatively coupled to the memory. The information processing system also comprises a community manager module that is communicatively coupled to the memory and the processor. The community manager module comprises a graphing module that analyzes a set of virtual world information associated with a virtual world and a set of social network information associated with a social network. A graph comprising a plurality of vertices is generated based on the analyzing. Each vertex represents a respective one of virtual world information in the set of virtual world information and social network information in the set of social network information. Each vertex is coupled to at least one other vertex by a respective edge. At least one edge of the graph couples a first vertex representing virtual world information and a second vertex representing social network information, thereby connecting the virtual world information to the social network information. An articulation point identifier determines that at least one vertex in the plurality of vertices is determined to be an articulation point having a respective edge. The removal of the respective edge of the articulation point causes disconnection of the virtual world information from the social network information within the graph. A notifier notifies a user associated with at least one of the virtual world information and the social network information via a graphical user interface that the graph comprises the articulation point.

In yet another embodiment, a computer program product for managing connections between a virtual world and a social collaboration platform is disclosed. The computer program product comprises instructions for analyzing a set of virtual world information associated with a virtual world and a set of social network information associated with a social network. A graph comprising a plurality of vertices is generated based on the analyzing. Each vertex represents a respective one of virtual world information in the set of virtual world information and social network information in the set of social network information. Each vertex is coupled to at least one other vertex by a respective edge. At least one edge of the graph couples a first vertex representing virtual world information and a second vertex representing social network information, thereby connecting the virtual world information to the social network information. At least one vertex in the plurality of vertices is determined to be an articulation point having a respective edge. The removal of the respective edge of the articulation point causes disconnection of the virtual world information from the social network information within the graph. A user associated with at least one of the virtual world information and the social network information is notified via a graphical user interface that the graph comprises the articulation point.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Also, the terms "node" and "vertex" and their derivatives are used interchangeably throughout the following discussion.

Operating Environment

Figure 1:
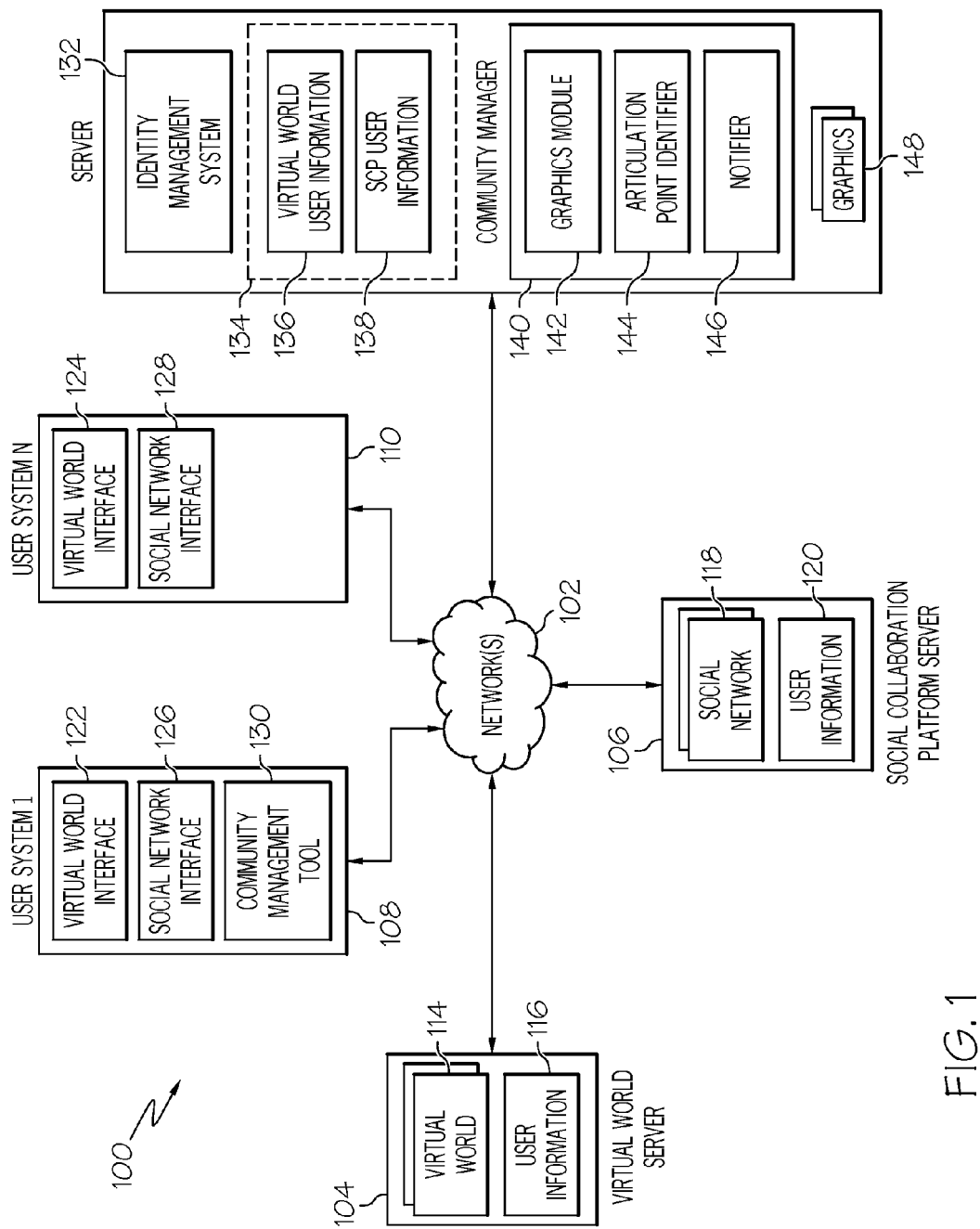
FIG. 1 is a block diagram illustrating one example of an operating environment according to one embodiment of the present invention.

According to one embodiment, FIG. 1 illustrates one example of an operating environment/system 100 that bi-directionally links virtual worlds and social collaboration platforms and identifies key connections between a user's virtual worlds and social collaboration platforms. It should be noted that bi-directionally linking virtual worlds and social collaboration platforms is discussed in greater detail in the commonly owned and co-pending U.S. application entitled "Linking Virtual Worlds and Collaboration Platforms Bi-directionally Using A Central Identity Management System" filed on even date with the present inventors and by the same inventors as the present application, said application is hereby incorporated by reference in its entirety and herein referred to as the "Linking Application".

FIG. 1 shows one or more networks 102 that, in one embodiment, are wide area networks, local area networks, wired networks, wireless networks, and/or the like. In one embodiment, the environment 100 includes a plurality of information processing systems 104, 106, 108, 110, 112 that are communicatively coupled to the network(s) 102. The information processing systems 104, 106, 108, 110, 112 include one or more virtual world servers 104, one or more social collaboration platform servers 106, one or more user systems 108, 110, and one or more servers 112.

The virtual world server 104 comprises at least one virtual world 114, which creates a computer simulated world with real world aspects. The virtual world server 104 also includes user information 116 such as user contact information, user profile information, user identification information, avatar information, virtual world contacts for the user, and the like. The user information 116 can include any and all information that is required for a user to use and interact with the virtual world 114.

The social collaboration platform ("SCP") server 106 comprises at least one social network 118. It should be noted that throughout the following discussion the terms "social network", "social collaboration platform" and "real world community" are used interchangeably. The SCP server 106 also includes user information 120 such as user contact information, user profile information, user identification information, information, social network contact information for the user, and the like. The user information 120 can include any and all information that is required for a user to use and interact with the social network 118.

The user systems 108, 110 each include one or more virtual world interfaces 122, 124 and/or social network interfaces 126, 128. The virtual world interfaces 122, 124 and social network interfaces 126, 128 allow the user systems 108, 110 to communicate with the respective virtual world(s) 114 and social network(s) 118. The virtual world interfaces 122, 124 and social network interfaces 126, 128 also allow a user associated with each user system 108, 110 to interact with the respective virtual world(s) 114 and social network(s) 118. The virtual world interfaces 122, 124 and social network interfaces 126, 128, in one embodiment, can be a tool such as an application(s), a website, a web application, a mashup, and the like.

The server 112, in one embodiment, includes an identity management system (IMS) 132 that communicatively couples the virtual world 114 and the social network 118 together. The IMS 132, in one embodiment, links virtual identities to identities of the same individual in social collaboration platforms in order to facilitate sharing information between members of the social collaboration platform. This allows a user who is online in a virtual world 114 to determine when a social network contact is also online in the same virtual world 114 (or vice versa). Using such a system, a user in the virtual world 114 is able to be notified when a person corresponding to a contact the user has in a social networking system is online in the virtual world and, for example, contact the virtual world presence of that contact or be "teleported" or re-located to the location of the contact. The IMS 132 also provides identity verification of virtual world identifiers based upon, for example, associations in social networking systems, so that a user in a virtual world 114 can verify the identity of another virtual world avatar. The IMS 132 further allows a user to receive notification of events that have occurred in the user's social network 118 when the user is online in the virtual world 114. The IMS 132 also allows a user to push information from the virtual world 114 to his/her social network 118. The Linking Application discusses these aspects as well as other aspects of the IMS 132 in greater detail.

The IMS 132, as described for the various embodiments discussed in the Linking Application, stores community information 134 for each user of a virtual world and/or a social network. The community information includes virtual world information 136 and social network information 138 for each user. For example, the virtual world information 136 identifies a given user within a virtual world and any other users in the virtual world associated with the given user. For example, the virtual world information 136 identifies that User A of the virtual world 114 is associated (e.g., has as a contact) User B and User N of the virtual world 114. In one embodiment, a user is identified within a virtual world 114 via an identifier such as, but not limited to, an avatar identifier.

The virtual world information 136 includes identifiers for these contacts and can also include an identifier associated with the virtual world 114 as well to distinguish between multiple virtual worlds associated with the user. The social network information 136 includes an identifier for each social network 118 and also includes identifiers associated with users of the social network(s) 118. The social network information 136 further identifies each social network contact (e.g., other social network users associated with a given social network user) of a given social network user. The virtual world information 136 can cross reference the social network information 138, thereby linking a given virtual world user's social network contacts to his/her virtual world identifier. The social network information 138 can similarly cross reference the virtual world information 136, thereby linking a given social network user's contacts to his/her virtual world identifier. This linking/associating of virtual world information 136 to/with social network information 138 is discussed in greater detail in the Linking Application.

The server 112 also includes a community manager 140 that can be separate from the IMS 132 or included within the IMS 132. The community manager 140 identifies and manages the connections between users' virtual worlds 114 and social networks 118, which are referred to herein as communities. The community manager 140, in one embodiment, includes a graphing module 142, an articulation point identifier 144, and a notifier 146. The graphing module 142, in one embodiment, analyzes the community information 134 to generate one or more community management graphs associated with one or more virtual worlds 114 and one or more social networks 118.

These graphs can be associated with a specific user or multiple users of the virtual world(s)/social network(s). A community management graph 148 illustrates various connections between users in a virtual world 114 and users in a social network 118. For example, a community management graph 148 illustrates, for a given user of a virtual world 114, each of the user's social networks 118, any contacts in those social networks 118 and their respective social network or virtual world contacts, virtual world contacts and their respective social network and virtual world contacts, and so on. These graphs 134 allow a user to more easily and more efficiently manage his/her virtual world/social network connections. The community management graphs 148 are discussed in greater detail below.

The community manager 140 also includes an articulation point identifier 144. The articulation point identifier 144 identifies key connection points and critical edges within a community management graph 148. These key connection points and critical edges connect a user's virtual world community to the user's social network community. If these points or edges were removed from the graph, the two communities would become disconnected. Removal of a point of the graph 148, in one embodiment, means that a person ceases to interact with the social collaboration platform 118 or the ceases to use their avatar to interact in a virtual world 114. A person may not explicitly delete their profile on a social collaboration platform 118 or delete their avatar in the virtual world 114. However, if they cease to be active in either world, this is equivalent to the node that corresponds to their profile being removed from the graph 148. Removal of an edge in the graph means that a node was removed and the edges connected to that node. In other words, the connections of the person corresponding to that node with other people in the virtual world 114 and/or social network 118 are removed as a result. Therefore, the community manager 140 identifies these points so that a user can proactively manage his/her critical connections between the user's virtual world 114 and the user's social network 118. The articulation point identifier 144 is discussed in greater detail below.

The community manager 140 also includes a notifier or interface 146 that communicates the community management graph 148 including the articulation point information to a user. The notifier/interface 146 allows one or more users to manage his/her community management graphs 148 via a community management tool 130 residing at the user system 108. The community management tool 130 can reside at any user system 108 or at a user system that is associated with a user who is a community manager or leader (i.e., a user who manages the connections between a virtual world and a social network). It should be noted that the community manager 140 can also reside at the user system 108 and the community management tool 130 can reside within the community manager 140 as well.

The community management tool 130 allows the user associated with the user system 108 to manage community connections based on information received from the community manager 140 at the server 112. For example, community management tool 130 can be an application(s), a website, a web application, a mashup, and the like that displays/visualizes community connection information such as the community management graph 148 received from the community manager 140. In one embodiment, the community management tool 130 displays one or more of the community management graphs 148 associated with one or more virtual worlds 114 and one or more social networks 118. These graphs 148 are automatically generated and displayed in the community management tool 130. Also, the graphs 148 can be generated and/or displayed based on the user requesting these operations through the management tool 130. As discussed above, these graphs 148 can be associated with a specific user or multiple users.

A user via the community management tool 130 is able to configure the community manager 140. For example, the user can configure the community manager 140 with respect to how frequent a graph analysis of the virtual world 114 and/or social network 118 is performed. The user can also configure the community manager 140 to generate alerts based on information in the graphs and how these alerts are communicated to the user. For example, the user can configure the community manager 140 to generate a warning if the number of connections within a graph 148 between a virtual world 114 and a social network 118 is below a given threshold, which can be set by the user. Another example is that a user can configure the community manager 140 to generate an alert if an articulation point (e.g., an identity connected to an edge whose removal disconnects the graph 148) is found in a graph 148. The user can also configure the community manager 140 to output recommendations (and how frequent these recommendations are given) on how to keep the graph (and hence the virtual world 114 and social network 118) well connected by identifying people (nodes) with high connectivity (in both their intra-community network, and/or inter-communities) to the user (e.g., community manager) and recommending that edges be added to these nodes. Addition of an edge between two nodes can be defined as establishing contact between the two people represented by the nodes, where the method of establishing contact is generic. For example, establishing contact can include, but is not limited to, sending an email or phone call or a "add friend request" on a social collaboration platform such as Facebook, and the like. It should be noted that a user can perform additional operations using the community management tool not listed above. The community management tool 130 is discussed in greater detail below.

Community Management

As discussed above, the community manager 140, in one embodiment, identifies and manages connections between virtual world 114 and social network 118 communities. In one embodiment, the community manager 140 builds a community management graph 148 for a user of a virtual world 114 (or a social network 118). This graph 148 comprises vertices (nodes) representing virtual world identifiers of the user such as an avatar and vertices comprising social network identifiers of the user. This community management graph 148 comprises two types of edges (1) inter-community edges and (2) intra-community edges, as shown in FIG. 2.

Figure 2:
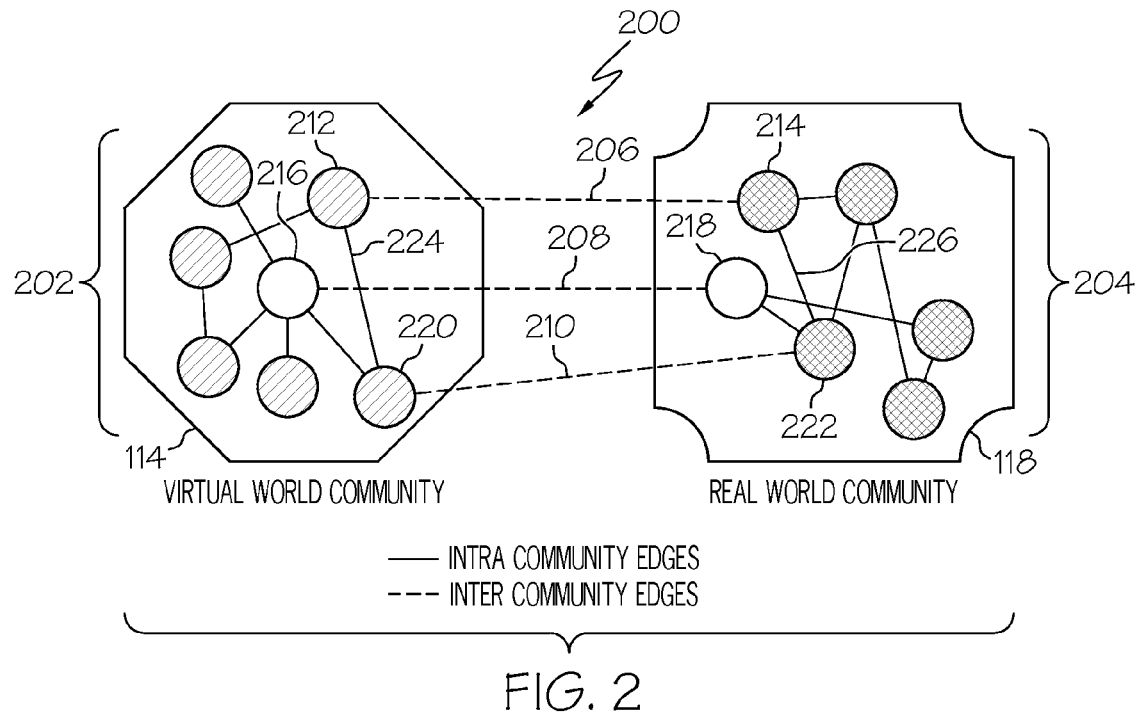
FIG. 2 illustrates a graph comprising inter-community edges coupling virtual world information with social network information according to one embodiment of the present invention.

For example, FIG. 2 shows a high level community management graph 200 comprising a plurality of vertices 202 associated with a virtual world 114 and a plurality of vertices 204 associated with a real world community such as a social network 118. FIG. 2 shows inter-community edges 206, 208, 210 between the virtual world vertices and the real world vertices 212, 214, 216, 218, 220, 222. FIG. 2 also shows intra-community edges 224 between virtual world vertices such as vertex 212 and vertex 220. FIG. 2 further shows intra-community edges 226 between real world vertices such as vertex 214 and vertex 222. In one embodiment, the inter-community edges 206, 208, 210 include interconnections between a user's virtual world identifier and the user's social network identifiers. The intra-community edges 224, 226 are edges within a community. For example, in a virtual world community 114 the intra-community edges 224 connect two virtual world identifiers that represent two different people who know and interact with each other in a virtual world 114.

Figure 3:
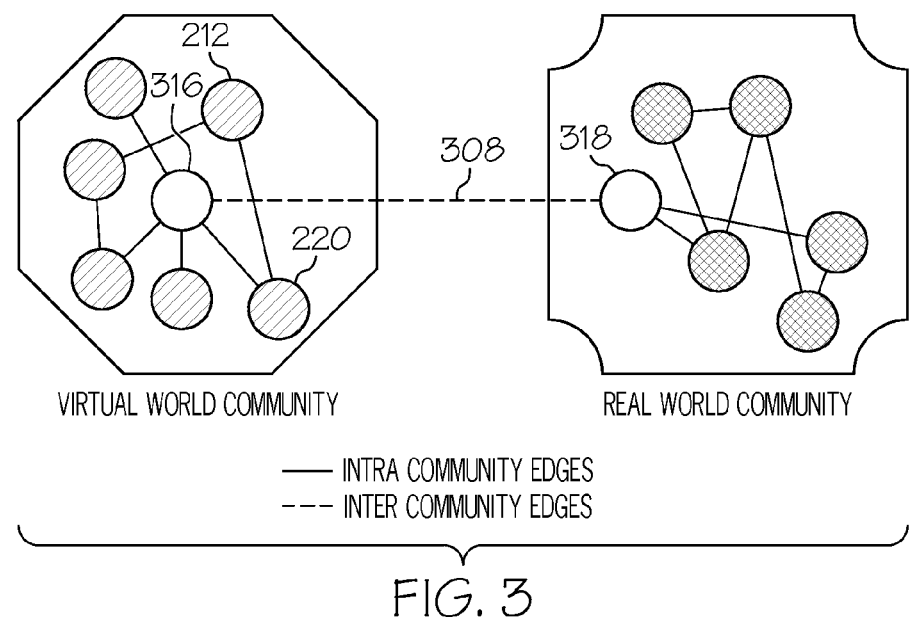
FIG. 3 illustrates a graph comprising an articulation point between virtual world information and social network information according to one embodiment of the present invention.

As discussed above, the community management graphs 148 can include one or more articulation points as shown in FIG. 3. For example, FIG. 3 shows an example of an articulation point that is identified by the community manager 140 via the articulation point identifier 144. In particular, FIG. 3 shows an articulation point, for example at vertex 316 that is connected to another vertex 318. These vertices 316, 318 represent two individuals in two different communities (i.e., the virtual world 114 and the social network 118). These vertices 316, 318 are connected by a single inter-community edge 308, referred to herein as a critical edge. The removal of this edge 308 results in contacts (node 316 and node 318) connected in the virtual world community 114 and the real world community 118, as defined by the community manage graphs, becoming disconnected from each other. The single inter-community edge 308 is identified by the community manager 140 as a critical edge since the removal of this edge 308 causes the two communities 114, 118 to become disconnected from each other.

The following is a more detailed discussion on creating and managing the community management graphs 148. The community manager 148 creates the community management graphs 148 either automatically at given intervals or in response to a user's request for the creation of a community management graph. When the community manager 140 determines that a community management graph 148 is to be generated, the manager 140 analyzes the community information 134 discussed above.

Figure 4:
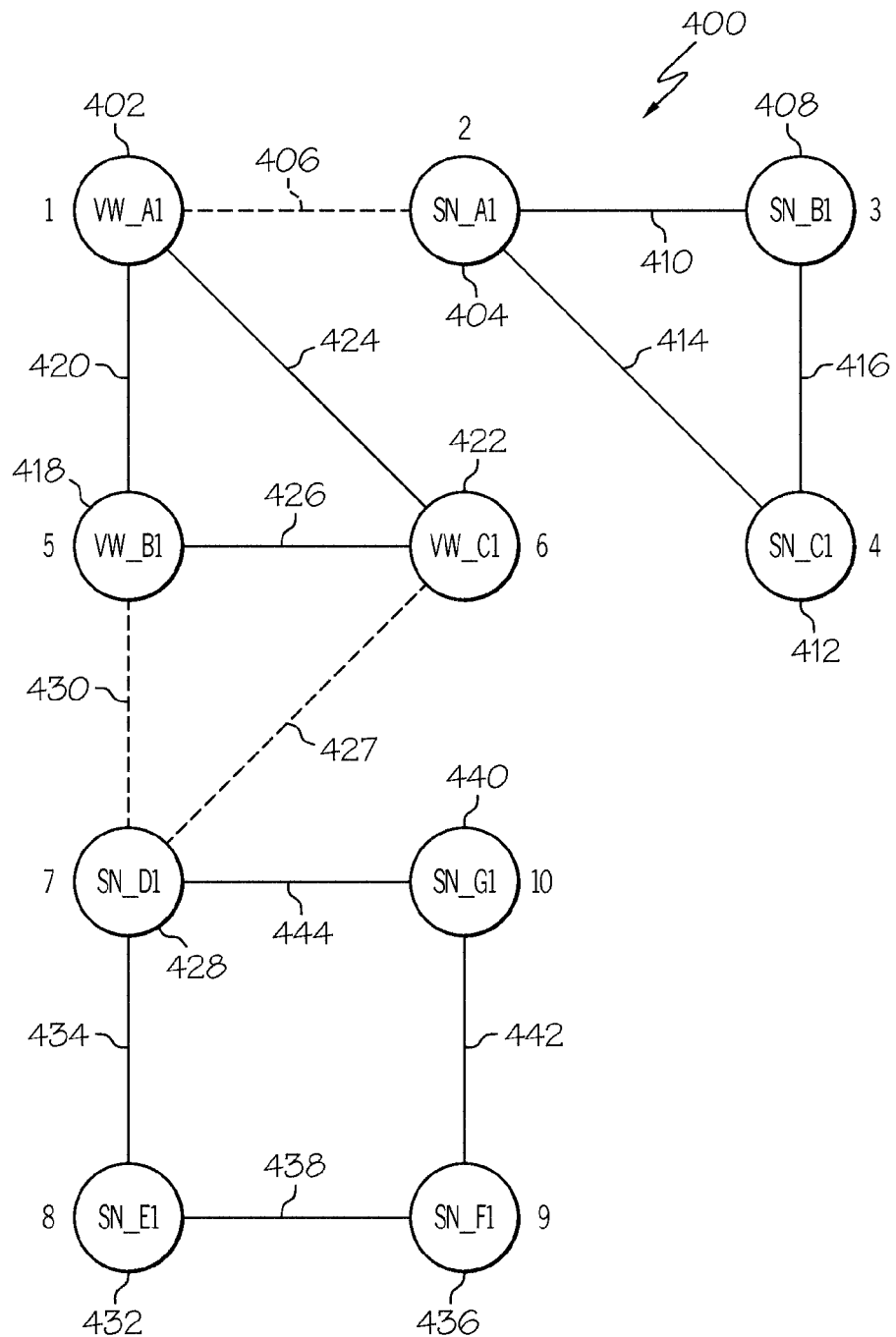
FIG. 4 is a graph comprising virtual world information and social network information according to one embodiment of the present invention.

FIG. 4 shows one example of a graph 400 that the community manager 140 generates from the community information 134 such as the virtual world user information 136 and the social network user information 138 for a given user. The graph 400 in FIG. 4 comprises ten vertices, which can either be virtual world identifiers or social network identifiers of a given user. The graph 400 also includes inter-community and intra-community edges connecting these vertices.

For example, a first vertex 402 comprises a virtual world identifier "VW_A1", which is the virtual world identifier for the given user associated with the graph 402. A second vertex 404 includes a social network identifier "SN_A1" that is associated with the given user of the graph 400. The first vertex 402 and the second vertex 404 are connected to each other by an edge 406. This edge 406 is an inter-community edge, as denoted by the dashed line, because it connects two communities such as the virtual world 114 and the social network 118.

A third vertex 408 comprises a social network identifier "SN_B1" that identifies another user in the social network 118 that is a contact of the given user within the social network 118. The second vertex 404 and the third vertex 408 are connected to each other by an edge 410. This edge 410 is an intra-community edge, as denoted by the solid line, because it connects two social network identifiers for the same social network 118. This indicates that the given user associated with the social network identifier "SN_A1" knows and interacts with the user associated with the social network identifier "SN_B1" within the social network 118.

A fourth vertex 412 includes another social network identifier "SN_C1" of another user within the social network 118. The second vertex 404 and the fourth vertex 412 are connected to each other by an edge 414. This edge is an intra-community edge because it connects two social network identifiers for the same social network 118. This indicates that the given user associated with the social network identifier "SN_A1" knows and interacts with the user associated with the social network identifier "SN_C1" within the social network 118. In other words, the user "SN_C1" is a social network contact of the given user ("VW_A1", "SN_A1").

The third vertex 408 and the fourth vertex 412 are connected to each other by an edge 416 as well. This edge is an intra-community edge because it connects two social network identifiers for the same social network 118. This indicates that user associated with the social network identifier "SN_B1" knows and interacts with the user associated with the social network identifier "SN_C1" within the social network 118. In other words, the user "SN_C1" is a social network contact of the user "SN_B1".

A fifth vertex 418 includes another virtual world identifier "VW_B1", which is a virtual world identifier for another user within the virtual world 114 that is associated with the given user. In other words, the given user having the virtual world identifier "VW_A1" knows and interacts with the user associated with the identifier "VW_B1" within the virtual world 114. The first vertex 402 and the fifth vertex 418 are connected by an edge 420, which in this example is an intra-community edge since it is an edge within a community. In other words, the edge 420 connects two vertices 402, 418 comprising virtual world identifiers for the same virtual world. It should be noted that when two or more virtual world identifiers and/or two or more social network identifiers are connected together these identifies are not limited to being associated with a different user. For example, in one embodiment, the user associated with the virtual world identifier "VW_A1" can also be associated with the virtual world identifier "VW_B1". In other words, a user can have more than one account in the virtual world 114 and/or social network 118.

A sixth vertex 422 includes another virtual world identifier "VW_C1". The sixth vertex 422 is connected to the fifth vertex 418 via an intra-community edge 426. The edge 426 indicates that the user associated with the virtual world identifier "VW_B1" has another virtual world identifier "VW_C1" within the virtual world 114. The sixth vertex 422 is also connected to the first vertex 402 by an edge 424, which in this example is an intra-community edge since it connects two vertices 402, 422 comprising virtual world identifiers for the same virtual world. In other words, the given user having the virtual world identifier "VW_A1" knows and interacts with the user associated with the identifier "VW_C1" within the virtual world 114. It should be noted that in another embodiment, the virtual world identifier "VW_C1" can be another virtual world identifier associated with the given user of the virtual world identifier "VW_A1" instead of the user of the virtual world identifier "VW_B1".

A seventh vertex 428 comprises a social network identifier "SN_D1" associated with the user corresponding to the virtual network identifiers "VW_B1" and "VW_C1" of the fifth and sixth vertices 418, 422 (since they are associated with the same user). The seventh vertex 428 is connected to the fifth vertex 418 by an inter-community edge 430. The sixth vertex 422 and the seventh vertex 428 are connected by an inter-community edge 427. This indicates that the user associated with the virtual identifier "VW_B1" and the virtual world identifier "VW_C1" has an identity of "SN_D1" within the social network 118. An eighth vertex 432 comprises a social network identifier "SN_E1", which indicates that the user associated with the social network identifier "SN_D1" (e.g., the same user associated with virtual world identifiers "VW_B1" and "VW_C1" in this example) has a social network contact "SN_E1". The seventh and eighth vertices 428, 432 are connected to each other by an intra-community edge 434 since these two users are within the same social network 118.

A ninth vertex 436 comprises a social network identifier "SN_F1" associated with yet another user. The ninth vertex 436 is connected to the eighth vertex 432 by an intra-community edge 438, which indicates that the user associated with the social network identifier "SN_E1" has a social network contact "SN_F1". A tenth vertex 440 comprises a social network identifier "SN_G1" associated with another user. The tenth vertex 440 is connected to the ninth vertex 436 by an intra-community edge 442, which indicates that the user associated with the social network identifier "SN_F1" has a social network contact "SN_G1". The tenth vertex 440 is also connected to the seventh vertex 428 by an intra-community edge 444, which indicates that the user associated with the social network identifier "SN_D1" has a social network contact "SN_G1".

As can be seen, the graph 400 indicates a virtual world (or social network) user's contacts within a social network 118 and the virtual world 114. The graph 400 also identifies the contact's identities within the virtual world and/or social network and any contacts associated therewith. This graph can be displayed to the given user via the community management tool 130. Once the graph has been created, the user via the community management tool 130 can instruct the community manager 140 to identify the articulation points, which are the critical vertices whose removal results in a disconnection between a user's virtual world community and real world community.

Figure 5:
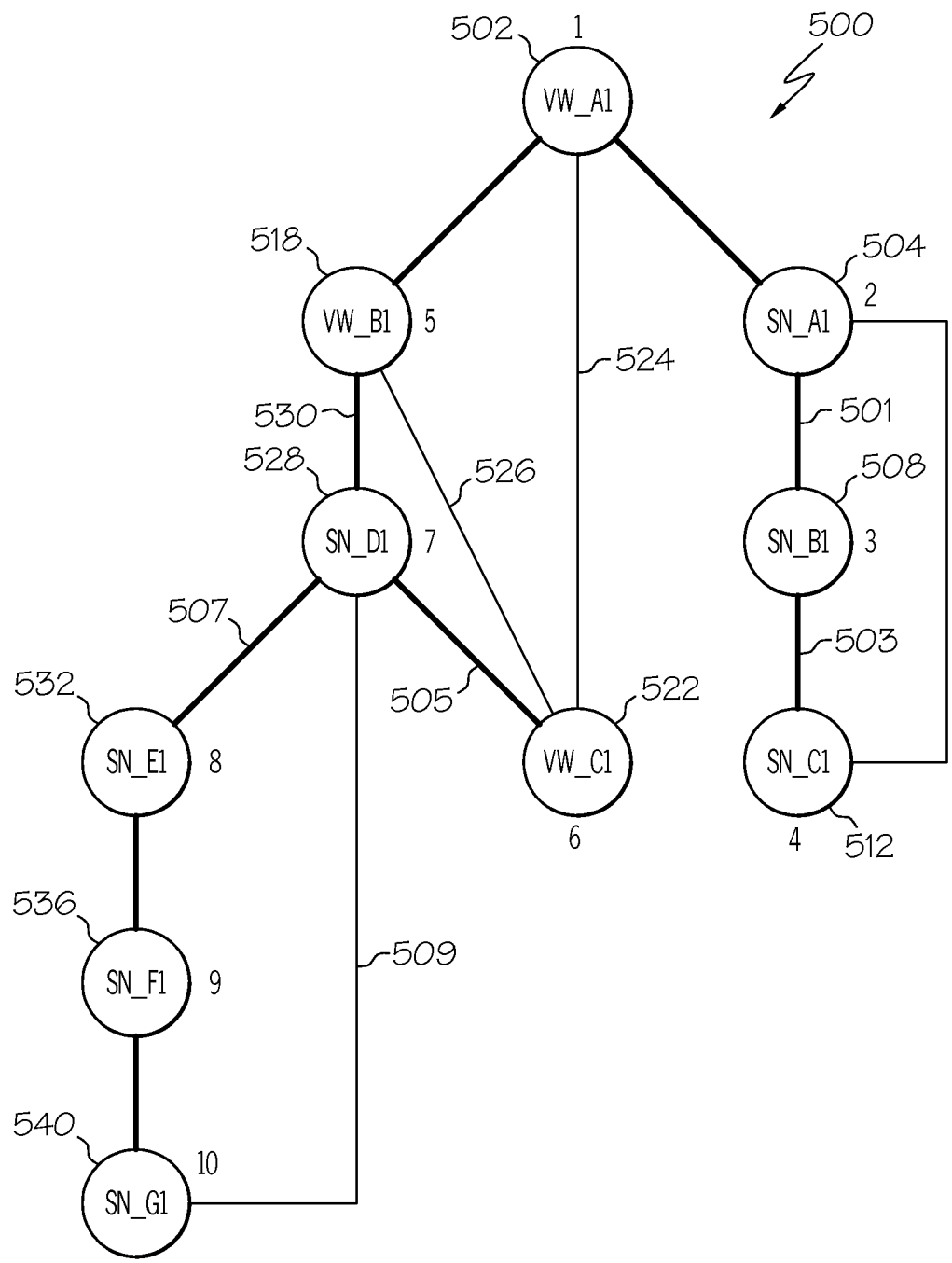
FIG. 5 illustrates a tree generated from the graph of FIG. 4 according to one embodiment of the present invention.

In one embodiment, the community manager 140 performs a search on the graph 400, which in one embodiment is a connected graph, using an operation such as (but not limited to) a Depth First Search (DFS). If the graph 400 is not a connected graph, then the following operations are performed separately on each connected component. The search operation generates a tree 500 of the graph 400, as shown in FIG. 5. The thicker lines in FIG. 5 indicate a depth first search tree while the thinner lines indicate back edges, which are edges of the original graph 400.

In the example of FIG. 5, the first vertex 502 is an ancestor of, for example, the second and fifth vertices 504, 518. The first vertex 502 is also the root of this tree 500. The root can be arbitrarily selected. However, in one embodiment, the root is designated a such before the search operation is performed on the tree, since the search commences from the root. Each edge (the thick and thin lines) is an undirected edge. An example of a descendent vertex is the seventh vertex 528, which is a descendent of the fifth vertex 518. An example of a leaf node is the tenth vertex 540, which is a leaf node because it does not have any children. The sub-graph created by second, third, and fourth vertices 504, 508, 512, and the edges 501, 503 connecting these vertices is an example of a cycle. The thicker edges between the second and third vertices 504, 508 and the third and fourth vertices 508, 512 represent a subtree. The entire graph outlined by the thicker edges is a tree because it does not have any cycles.

Once the community manager 140 generates the graph 400, as in FIG. 4, and creates the search tree 500, as in FIG. 5, the community manager 140 then identifies articulation points and critical inter-community edges within the tree 500. In one embodiment, the community manager 140 analyzes one or more of the vertices in the tree 500 to identify articulation points and/or critical inter-community edges. For example, the community manager 140 selects a vertex u, where u is not a leaf and u is not the root. The community manager 140 then identifies the children of vertex u such as v1, v2, . . . , vk. The community manager 140 determines that for each child there is a subtree of the DFS tree 500 rooted at this child. For example, the community manager 140 can select the seventh vertex 528 in FIG. 5 as vertex u, where the sixth, eighth, ninth, and tenth vertices 522, 532, 536, 540 are the children of the seventh vertex 528.

The community manager 140 then analyzes the graph to determine (1) if for some child of the vertex u there is no back edge going to a proper ancestor of vertex u and (2) if vertex u was removed then this subtree becomes disconnected from the rest of the graph. If so, then the community manager 140 identifies vertex u as an articulation point. In the example of FIG. 5, a proper ancestor of the seventh vertex 528 is the fifth vertex 518. As can be seen in FIG. 5, a back edge does not exist between the children 532, 536, 540 and the fifth vertex 518. Therefore, if the seventh vertex 528 was removed then the eighth, ninth, and tenth vertices 532, 536, 540 are disconnected from the rest of the graph. Therefore, the community manager 140 identifies the seventh vertex 528 as an articulation point. Even further, the community manager 140 identifies all the edges connected to node SN_D1 (the seventh vertex 528), which is edge 530 between fifth vertex 518 and the seventh vertex 528; the edge 505 between the seventh vertex 528 and the sixth vertex 522; the edge 507 between the seventh vertex 528 and the eighth vertex 532; and the edge 509 between the seventh vertex 528 and the tenth vertex 540 as a critical inter-community and intra-community edges since the removal of these edges 530, 505, 507, 509 disconnects the virtual world 114 associated with the virtual world identifier VW_B1 from the social network 118 associated with the social network identifier SN_D1.

However, if the community manager 140 (1) determines that every one of the subtrees rooted at the children of vertex u have back edges to proper ancestors of u and (2) that if vertex u is removed the graph remains connected (the backedges hold everything together), then vertex u is not an articulation point. Therefore, an articulation point is defined as follows: an internal vertex u of the DFS tree 500 is an articulation point if and only there exists a subtree rooted at a child of vertex u such that there is no back edge from any vertex in this subtree to a proper ancestor of u.

In addition, the community manager 140 also determines the discovery time for each vertex in order to identify articulation points. As the community manager 140 travels from vertex u towards the root, the discovery times of these ancestors of u get smaller and smaller (the root having the smallest discovery time of 1). Therefore, the community manager 140 tracks keeps track of the back edge (v, w) that has the smallest value of d[w], where d is the discovery time; (v, w) is a back edge; vertex v is a descendent of vertex u; and vertex w is an ancestor of vertex u. For example, if the seventh vertex 528 in FIG. 5 is vertex u then vertex v is the sixth vertex 522, vertex w is the fifth vertex 518 (or the first vertex 502), and the back edge (v, w) is edge 526.

Figure 6:
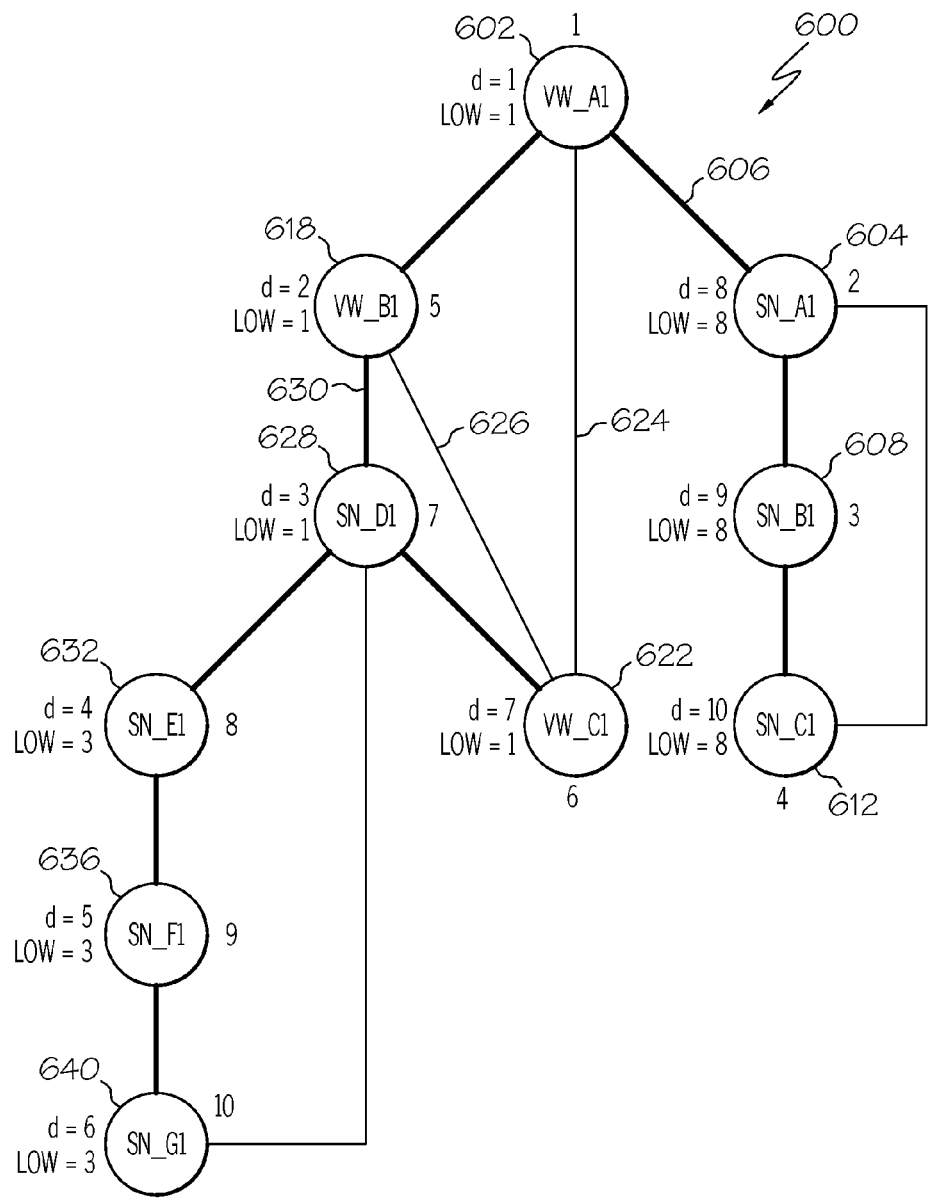
FIG. 6 illustrates discovery times and minimum discovery times of the tree in FIG. 5 according to one embodiment of the present invention.

As can be seen in FIG. 6, the community manager 140, using a searching operation such as (but not limited to) Depth First Search, which always commences at a node in the graph 400 designated as the root, e.g., the first vertex 502, determines that the discovery time of the first vertex 502 is d=1. The discovery time of the fifth vertex 518 is d=2; the seventh vertex 528 is d=3; the eighth vertex 532 is d=4; the ninth vertex 536 is d=5; the tenth vertex 540 is d=6; the sixth vertex 522 is d=7; the second vertex 504 is d=8; the third vertex 508 is d=9; and the tenth vertex 512 is d=10.

The community manager 140 also identifies minimum discovery times for each vertex as well. The minimum discovery time is designated as "Low [u]" and is defined as the minimum of d[u] and d[w], wherein (v, w) is a back edge and v is a descendent of u, and w is an ancestor of u. It should be noted that term "descendent" is used in the non-strict sense, that is, v may be equal to u. Intuitively, Low [u] is the highest (closest to the root) that one can get in the tree by taking any one back edge from either u or any of its descendents. It should also be noted that "Low" means low discovery time, not a lowest position in the tree.

To determine the low discovery time, the community manager 140 performs the following. Assuming that the community manager 140 is performing DFS on the vertex u, the community manager 140 initializes Low [u]=d[u]. The community manager 140 determines if there is an edge (v, w) for vertex u, where v is a descendent of u, and w is an ancestor of u. If so, then Low [u]=min(Low [u], d[w]). In other words, if the back edge goes to a lower d value than a previously existing back edge then the community manager 140 makes this lower d value the new low. For example, assume that the seventh vertex 528 is vertex u. The seventh vertex 528 has a child 622 that has two back edges 624, 626. The first back edge 626 connects the child 622 to the fifth vertex 618 and the second back edge 624 connects the child 622 to the root 602. Therefore, because the second back edge 624 connects to the root 602, which has a lower d value (d=1) than the fifth vertex 618 (d=2), the low value of the seventh vertex 628 is Low=1. It should be noted that the process determining the discovery times d and the minimum discovery time Low for a tree edge is the same as the process discussed above.

For example, the articulation points in FIG. 6 are the seventh vertex 628 and the second vertex 604 (and, of course, the root 602). The seventh vertex 628 is an articulation point because it has child such as the eighth, ninth, and tenth vertices 632, 636, 640 and one or more of these children have a Low value (e.g., Low=3 that is equal to the discovery time d=3 of the seventh vertex 628. In other words, one or more of these children 632, 636, 640 do not have a back edge that goes to a proper ancestor such as the root 602 or the fifth vertex 618 of the seventh vertex and if the seventh vertex 628 was removed this subtree is disconnected from the rest of the graph. The second vertex 604 is an articulation point for the same reasons. In one embodiment, the community manager 140 analyzes the identified articulation points and further identifies the articulation points that connect a virtual world 114 to a social network 118 such as the second and seventh vertices 604, 628.

In addition to identifying the articulation points, the community manager 140 also identifies the critical edges associated with the articulation points. A critical edge, in one embodiment, is an edge that connects an articulation point to a vertex and if removed disconnects the articulation point from the vertex. For example, in FIG. 6, the community manager 140 identifies the edges 606, 630 as critical edges. It should be noted that although edges 606, 630 are inter-community edges, the community manager 140 also identifies intra-community edges connected to articulation points as critical edges as well.

As can be seen, if the critical edges 606, 630 were removed, the virtual world 114 as represented by the virtual world identifiers is disconnected from the social network as represented by the social network identifiers. In one embodiment, the community manager 140 identifies the critical edges that are inter-community edges. In other words, the community manager 140 identifies the critical edges that connect a virtual world 114 with a social network 118. Table 1 below gives an example of pseudocode for performing the articulation point identification operations discussed above.

TABLE 1

```
FindArticulationPoints(u){
    color[u] = gray
    Low[u] = d[u] = ++time
    for each (v in Adj(u)) {
        if (color[v] == white) {               // (u,v) is a tree edge
            pred[v] = u
            FindArticulationPoints (v)
            Low[u] = min(Low[u], Low[v])       // update Low[u]
            if (pred[u] == NULL) {             // Is the root an AP?
                if (this is u's second child)
                    Add u to set of articulation points
            }
            else if (Low[v] >= d[u]) {         // internal node
                Add u to set of articulation points
            }
        }
        else if (v != pred[u]) {               // (u,v) is a back edge
            Low[u] = min(Low[u], d[v])         // update L[u]
        }
    }
}
```

Figure 7:
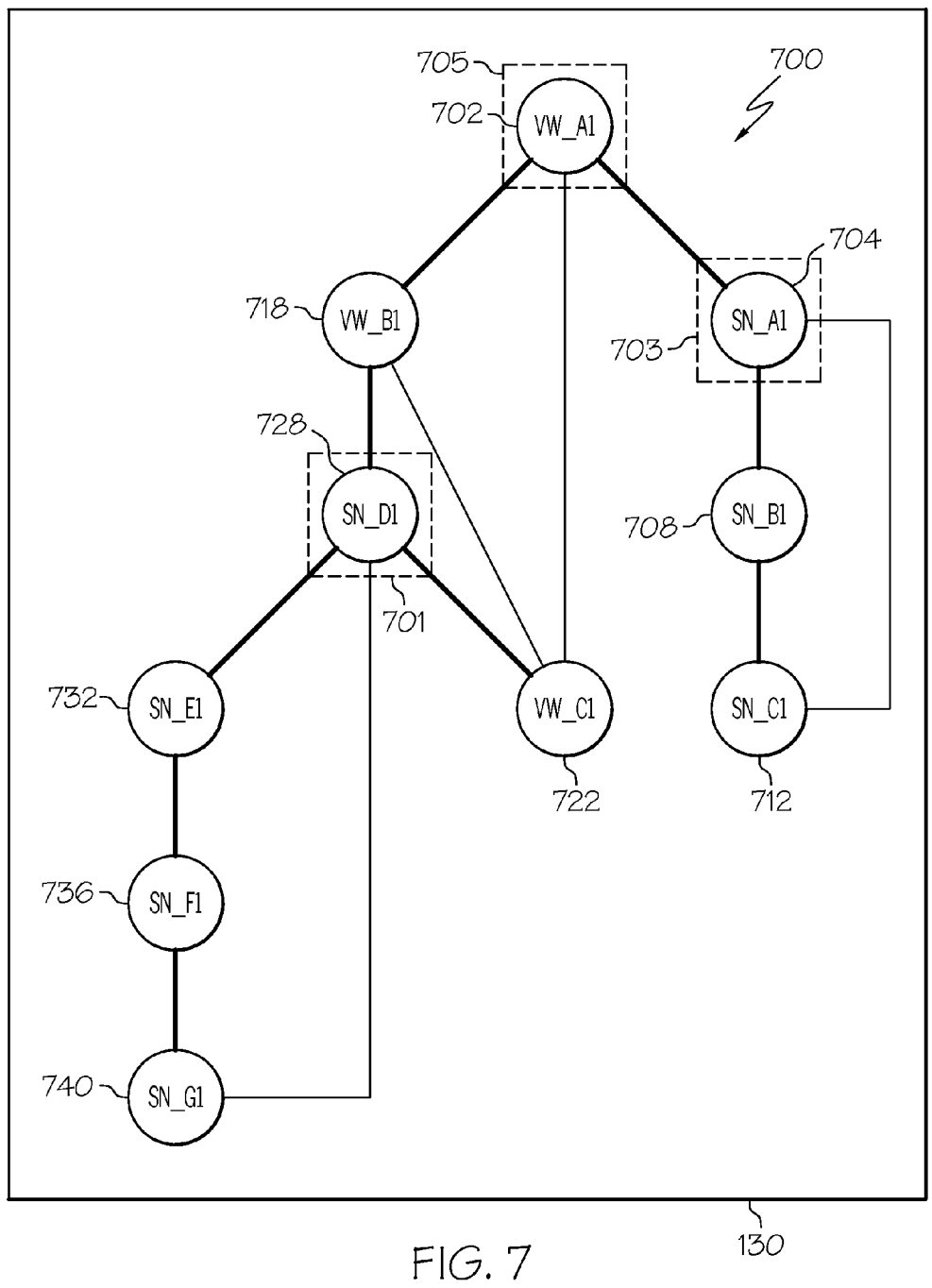
FIG. 7 illustrates one example of a community management tool displaying the tree of FIG. 5 with articulation points according to one embodiment of the present invention.

Once the community manager 140 identifies the articulation points and critical edges, the community manager 140 can display these items in the community management tool 130 as shown in FIG. 7. For example, the community manager 140 can visually change a vertex to indicate that the vertex is an articulation point as indicated by the dashed boxes 701, 703, 705. The community manager 140 can also visually change an edge to indicate that the edge is a critical edge. The community manager 140 can also identify articulation points and critical edges to a user using alphanumeric strings, audio, and the like.

In addition to identifying articulation points and critical edges, the community manager 140 monitors the number of inter-community edges and also identifies where inter-community edges should be added so that the graph can become more strongly connected. This strengthens the graph so that there is less potential for the graph to become disconnected, i.e., the virtual world information to become disconnected from the social network information by removal of an edge, such as by a user removing an association for his/her identifier.

The community manager 140 identifies where inter-community edges should be added, in one embodiment, as follows. For each profile ID (e.g., vertices with virtual world identifiers and social network identifiers) that is active in a virtual world community and a real world community, the community manager 140 identifies which one has the highest number of intra-community connections and is most well connected in terms of inter-community edges in both the real and the virtual world community. The top n profile IDs can be recommended to a user via the community management tool 140 as points to add edges (either intra-community edges or inter-community edges depending on the nodes being connected) to in order to strengthen the connectivity between their real and virtual world communities. In one embodiment n is a user defined parameter greater than zero.

For example, FIG. 7 shows the community management tool 130 displaying a graph 700 with various vertices. The community manager 140 has determined that the second and seventh vertices 704, 728 are where additional connections should be made, as discussed above. The community management tool 130 indicates to the user that these vertices 704, 728 are where additional connections should be made. The community management tool 130 can visually change the vertices 704, 728 as indicated by the dashed boxes 701, 704 or can list the vertices in a separate area of the tool 130. The user can then add additional members (i.e., create additional edges) to increase the connectivity of the graph so that there is less potential for the virtual world information to become disconnected from the social network information. In one embodiment, the user adds additional members such that the connections associated with these members in the graph create additional connections between social network and virtual world vertices. In another embodiment the user can add additional members by encouraging friends of nodes 728 and 704 to be added to the user's friend list on a social collaboration platform such as Twitter.

Figure 13:
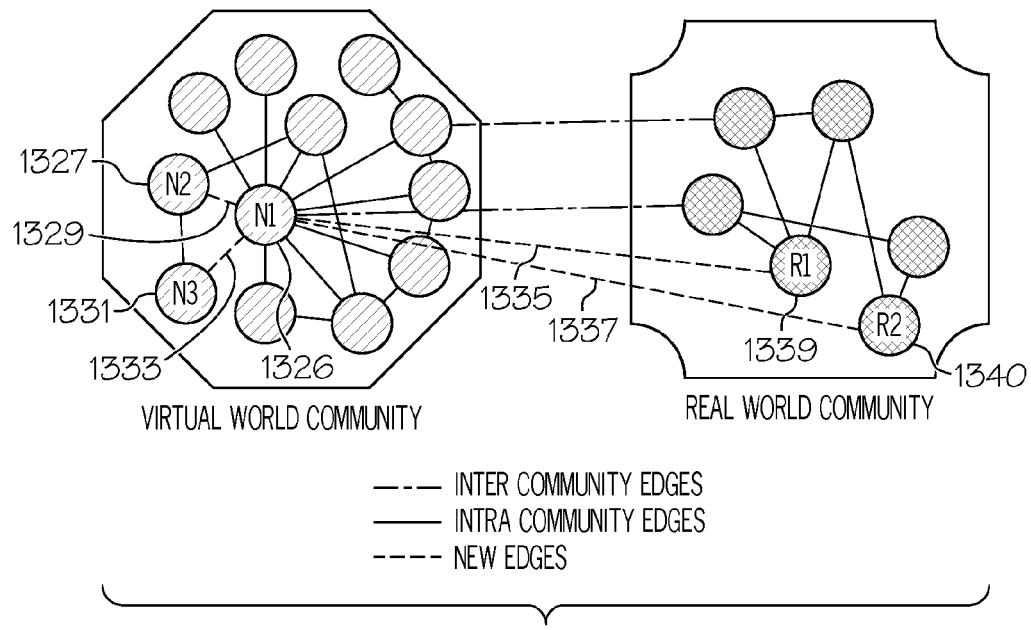
FIGS. 13-14 illustrates examples of node connectivity in graphs representing virtual world and real world information according to one embodiment of the present invention.
Figure 14:
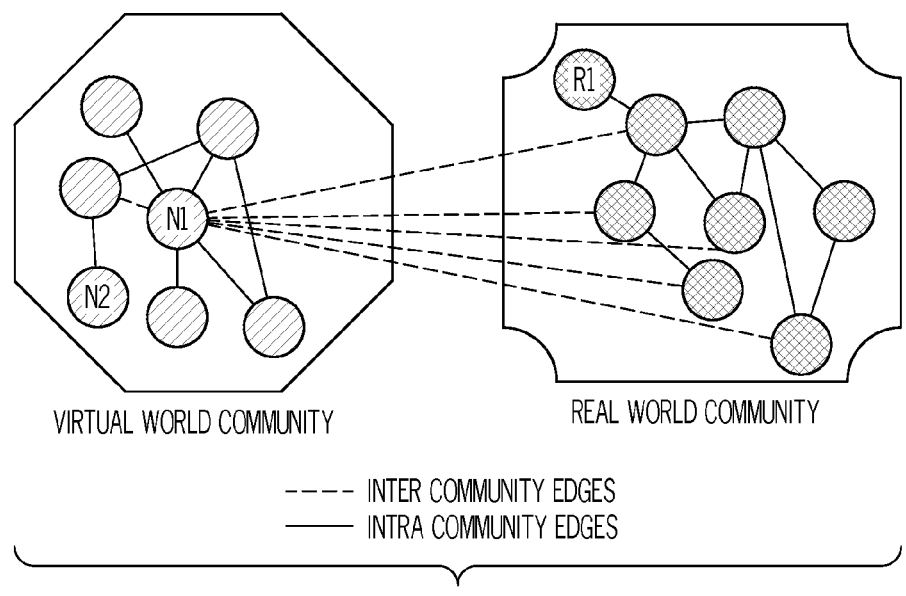

For example, FIG. 13 shows that a node can comprise many intra-community edges. In the example of FIG. 13, node N1 1326 is a highly intra-connected node. In another example, FIG. 14 illustrates an example of a Node N1 1326 that is also a highly inter-connected node. Node N1 1326 within the virtual world community illustrated in FIG. 14 has multiple inter-community edges between itself and social network nodes, which correspond to, for example, real-world community nodes. In either example shown by FIGS. 13 and 14, the community manager 140 can notify a user in either community to add additional edges such as intra-community edges and/or inter-community edges. For example, the community manager 140 can notify users associated with one or more of node N1 1236, and two other nodes, such as node N2 1327, and/or node N3 1331, to add additional intra-community edges 1329, 1333 between node N1 1326 and node N2 1327 and between node N1 1326 and node N3 1333. The community manager 140 can also notify the users associated with the relevant nodes to add additional inter-community edges 1335, 1337 between, for example, node N1 1326 and node R1 1339 and between node N1 1326 and node R2 1340.

The following are examples that illustrate the advantages of identifying to a user the articulation points, critical edges, and areas where additional connections should be made. One example application utilizing an embodiment of the present invention is a network of individuals that are connected in the real world through alumni networking sites, and through other social networking tools such as email and/or social networking websites. One or more of the individuals may have communities in a virtual world as well where they meet and interact. Members of both virtual and real world alumni communities can network at events in both communities and notify other community members of such events. The community manager 140 generates one or more graphs representing the connections of these individuals in the virtual world and social network. If there are critical connections whose removal would disconnect these two worlds, the community manager 140 can identify and notify the individuals that make these critical connections so that they can act as leaders to connect the two communities and proactively create more inter-community edges by identifying individuals in both communities.

Another example is with respect to a sales team that has a social community built through online collaboration platforms and various team rooms. In this example, this real world community is connected to a sales team in a virtual world community. Therefore, it is important for the two communities to be well connected. If the two communities are disconnected, then both sales team communities may target the same customers or conduct other redundant activities. On the other hand if the real world community is well connected with the virtual world community, the sales team overall can benefit from this communication by (1) dividing up the customer base, and targeting different customer segments; (2) sharing marketing strategies in each community that produced sales success; and (3) alerting the other community of events relevant to the other community's customer base.

An additional example is that a manager can be detect or be alerted that two teams are weakly linked, for instance through a single articulation point in the real-virtual world community graph. The manager can then identify someone connected with many people in one team to connect to someone from the other team, and then send that person an email. Another example is with respect to an individual connected to two communities in a social network. The community manager 140, via the community management tool 130, can show the individual that he/she is the only member left in both communities (i.e. the individual's node is the articulation point). The individual, via the community management tool, can take action and contact his/her friends in both communities and ask them to connect with each other, and in particular create inter-community edges. This strengthens the connections between the two communities so that when the friends in each community connect with each other, the user would no longer be an articulation point between the two communities.

Another example includes individual A in individual B's virtual world community. Individual A is interested in purchasing a car. Individual B has another friend, Individual C that has just purchased the same car and blogged about the purchase. Using the community management tool 140 individual B notices that he/she is the only connection between Individual A and Individual C. Therefore, Individual B asks Individual A to visit Individual C's blog and asks Individual A to write a comment on Individual C's blog by registering with Individual C's blog. In this way an edge is added between Individual A and Individual C in the Real-to-Virtual community graph as they become part of each other's personal networks.

Figure 8:
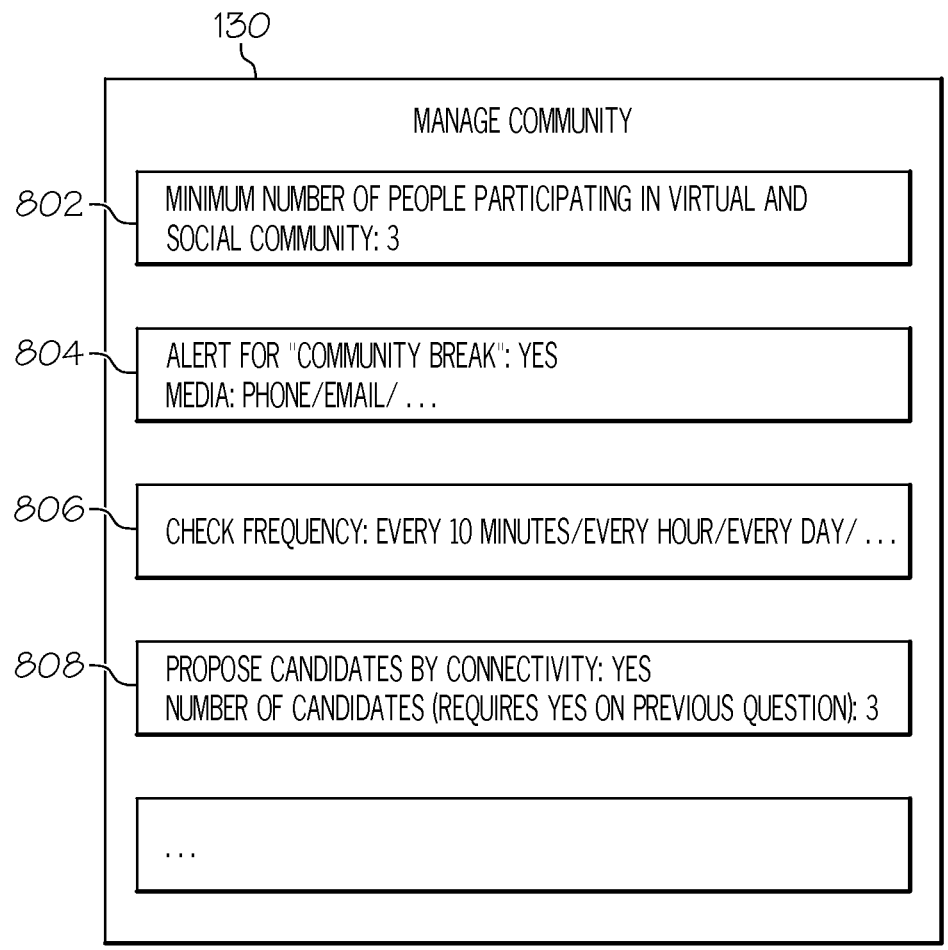
FIG. 8 illustrates another example the community management tool according to one embodiment of the present invention.

In addition to displaying the graph to a user, the community management tool 130 also allows the user to configure the community manager 140, as discussed above. For example, FIG. 8 illustrates various parameters that the user can set for the community manager 140. In particular, FIG. 8 shows a first parameter 802 that defines a threshold for the number of critical connections and also defines that a critical connection is an inter-community edge between virtual world and a real world social network. The process for determining articulation points forms the basis of identifying these critical edges. This instructs the community manager 140 to monitor the critical connections and determine whether the number of critical connections is above or below the threshold. A second parameter 804 instructs the community manager 140 as to whether an alert is to be generated when the number of critical connections falls below the threshold set by the first parameter 802. The second parameter 804 also defines an alert type such as email, phone, instant message, and the like. The third parameter 806 configures the community manager 140 as to how often to perform the graph analysis discussed above (e.g., identification of articulation points and critical edges). The fourth parameter 808 of one embodiment encourages proactive community management when articulation points are detected by instructing the community manager 140 that it should propose candidates to the user to create connections for strengthening the graph and how many candidates to propose. It should be noted that these parameters are only examples and do not limit the various embodiments of the present invention in any way.

As can be seen from the above discussion by informing the user of the critical edges, articulation points, and the areas in the graph where additional connections should be made, the user is able to proactively manage the connections between his/her virtual world and real world. The community management tool 130 allows users to strengthen the graph by adding additional edges to reduce the potential for a disconnection between the virtual world information and social network information. Various embodiments of the present invention notify individuals associated with critical edges so that that they can proactively manage the graph and suggest other individuals that they know as potential edges that can parallel their ability to connect their virtual world community with their real world community. Further, these individuals may be assigned as "communication leaders". As communication leaders these individuals can inform their network members in the virtual world about the communities and associations they are connected with in the real world in order to encourage more connections, and enrollment in those communities. The same can be done vice versa. These individuals can also inform network members in each community about events in the other community in order to encourage participation.

Operational Flow Diagrams

Figure 9:
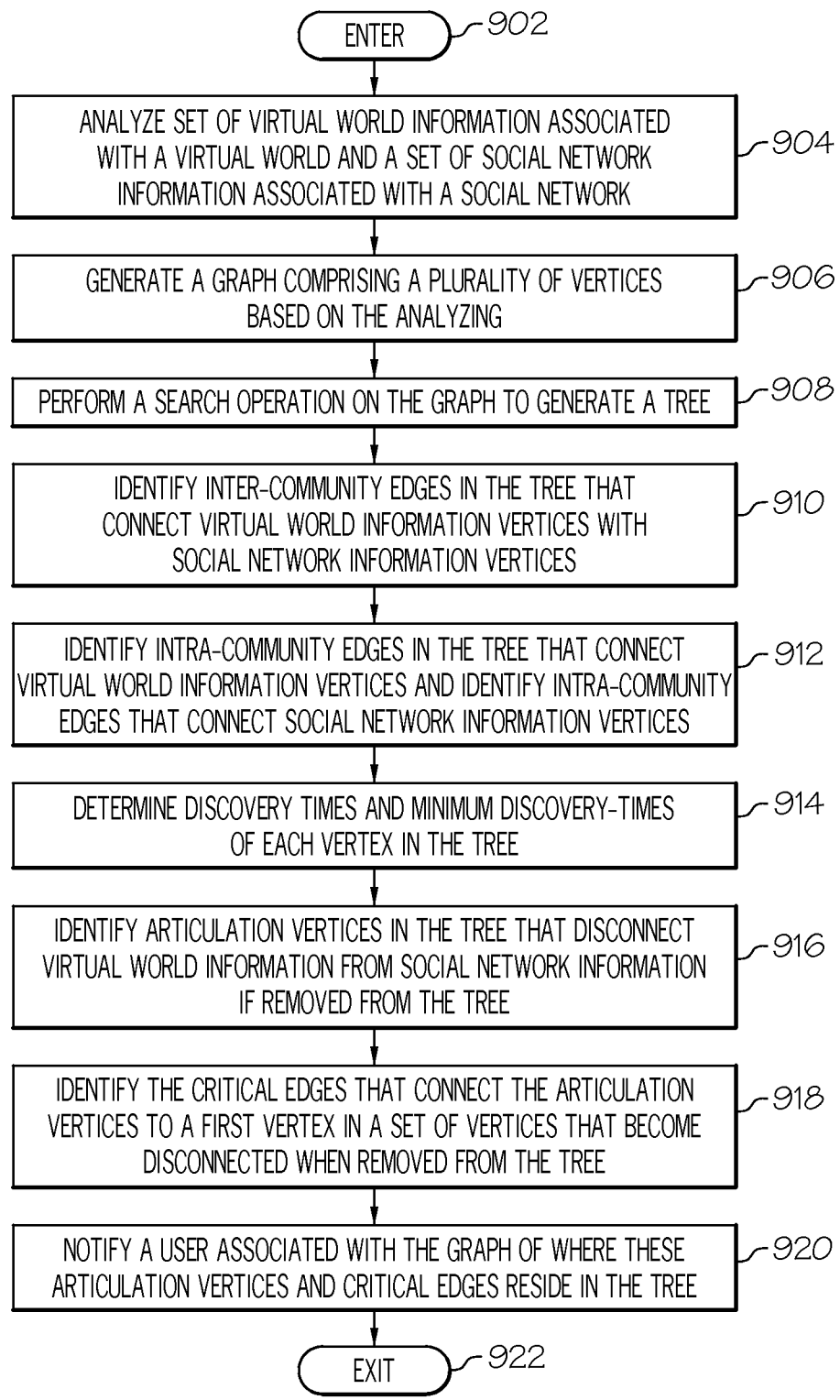
FIG. 9 is an operational flow diagram illustrating one example of managing connections between a virtual world and a social network according to one embodiment of the present invention.

FIG. 9 is an operational flow diagram illustrating one example of managing virtual world and social network connections. The operational flow diagram of FIG. 9 begins at step 902 and flows directly into step 904. The community manager, at step 904, analyzes a set of virtual world information 136 and a set of social network information 138. The set of virtual world information 136 is associated with a virtual world 114 and the set of social network information is associated with a social network 118. The community manager, at step 906, generates a graph 148 comprising a plurality of vertices based on the analyzing.

The community manager, at step 908, performs a search operation such as a DFS operation on the graph 148 to generate a tree 500. The community manager, at step 910, identifies inter-community edges in the tree 500 that connect virtual world information vertices with social network information vertices. The community manager, at step 912, identifies intra-community edges in the tree 500 that connect virtual world information vertices and intra-community edges that connect social network information vertices. The community manager, at step 914, determines discovery times and minimum discovery times of each vertex in the tree 500.

The community manager, at step 916, identifies articulation points/vertices in the tree 500 that if removed disconnect virtual world information from social network information. The community manager, in one embodiment, can use the discovery times and minimum discovery times to identify the articulation points/vertices, as discussed above. The community manager, at step 918, identifies the critical edges that connect the articulation vertices to a first vertex in a set of vertices that become disconnected when the edge is removed from the tree 500. The community manager, at step 920, notifies a user associated with the tree 500 where these articulation points/vertices and critical edges reside in the tree 500. The control flow then exits at step 922.

Figure 10:
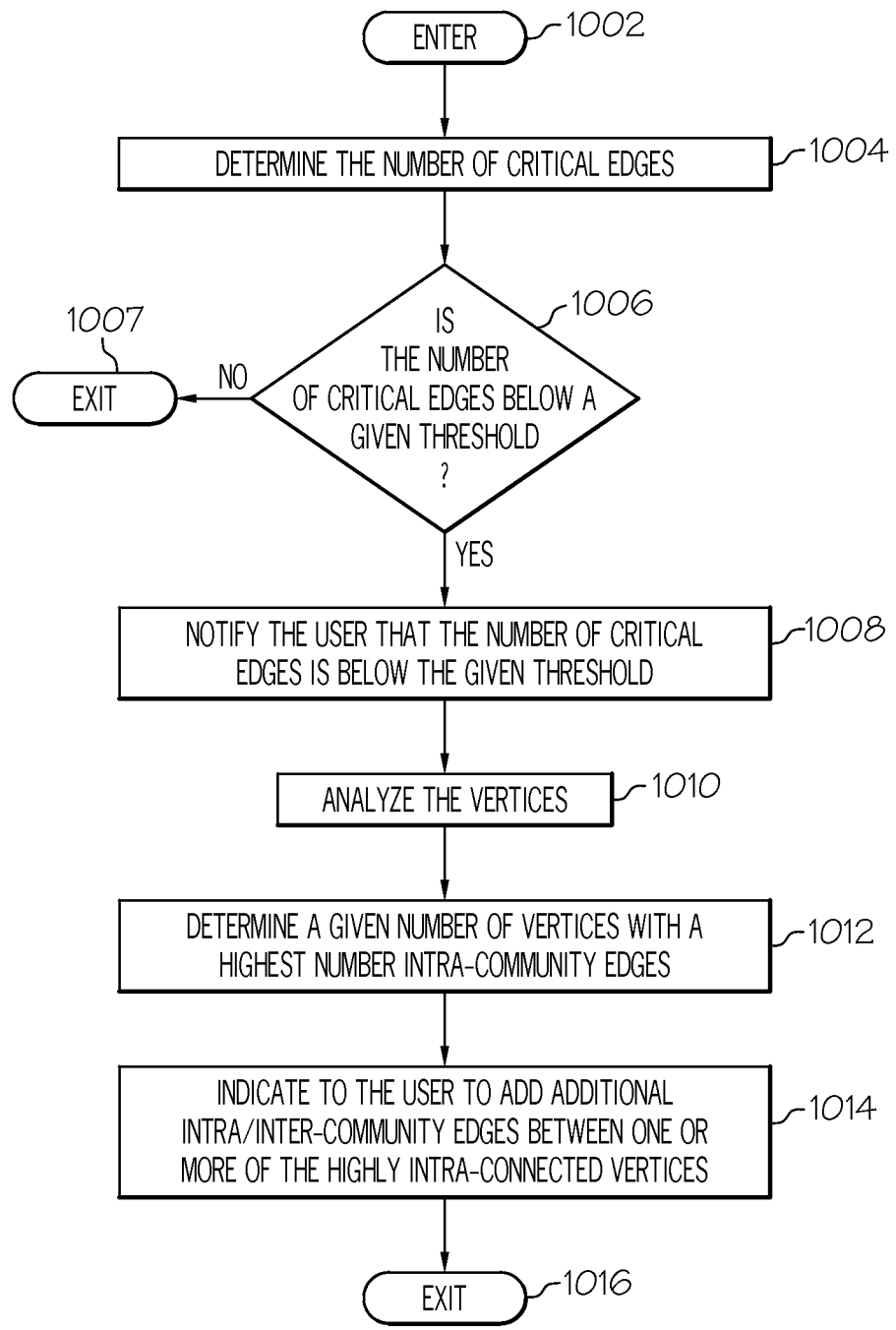
FIG. 10 is an operational flow diagram illustrating another example of managing connections between a virtual world and a social network according to one embodiment of the present invention.

FIG. 10 is an operational flow diagram illustrating another example of managing virtual world and social network connections. The operational flow diagram of FIG. 10 begins at step 1002 and flows directly into step 1004. The community manager 140, at step 1004, determines the number of inter-community edges within the tree 500. The community manager 140, at step 1006, determines if the number of inter-community edges is below a given threshold. If the result of this determination is negative, the control flow exits at step 1007. If the result of this determination is positive, the community manager 140, at step 1008, notifies the user that the number of inter-community edges are below the given threshold.

The community manager 140, at step 1010, analyzes the vertices within the tree 500. The community manager 140, at step 1012, determines a given number of vertices with a highest number of intra-community edges within the tree 500. This given number can be set by a user or the community manager 140 can select a default value. The community manager 140, at step 1014, indicates to the user to add additional inter-community edges at one or more of these highly intra-connected vertices. The control flow exits at step 1016.

Figure 11:
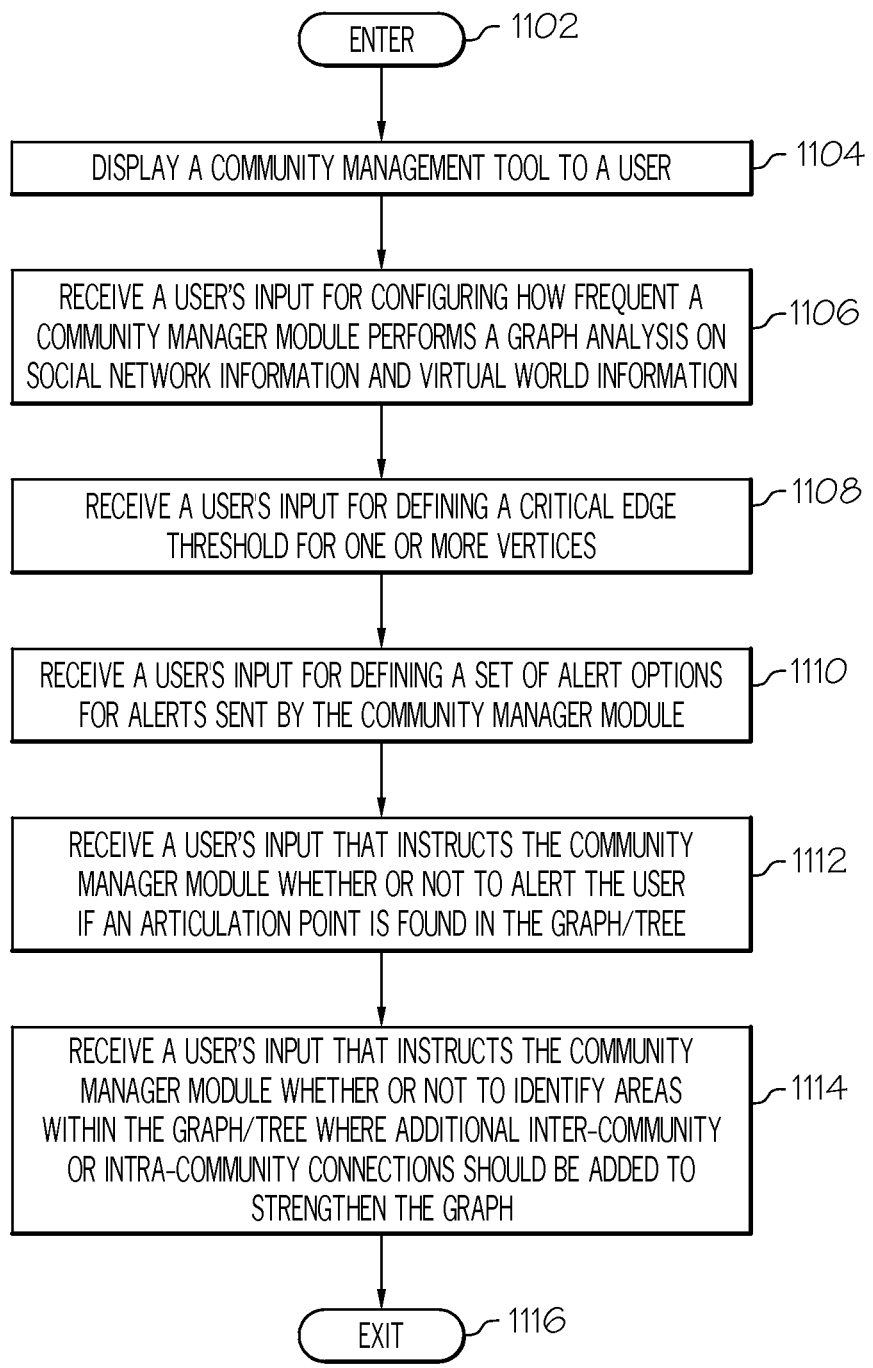
FIG. 11 is an operational flow diagram illustrating one example of configuring the community manager module according to one embodiment of the present invention.

FIG. 11 is an operational flow diagram illustrating one example of configuring the community manager module 140. The operational flow diagram of FIG. 11 begins at step 1102 and flows directly into step 1104. a community management tool 130, at step 1104, is displayed to a user. The community management tool 130, at step 1106, receives a user's input for configuring how often the community manager module 140 performs the graph analysis operations discussed above on social network and virtual world information 136, 138. The community management tool 130, at step 1108, receives a user's input for defining a critical edge threshold for one or more vertices. A critical edge threshold, in this example, is the minimum number of inter-community or intra-community edges of a vertex/node. If the intra or inter community edges of a vertex are below this threshold, then this vertex is marked as critical. It should be noted that the user can define what is "critical". For example, the user can configure the community manager 140 to look for critical inter-community edges, to monitor for intra-community edges, or both. If a user does not specify inter or intra community edges, then the community manager 140 can select a default.

The community management tool 130, at step 1110, receives a user's input for defining a set of alert options for alerts sent by the community manager 140. The community management tool 130, at step 1112, receives a user's input that instructs the community manager 140 whether or not to alert the user if an articulation point is found in the tree 500.

The community management tool 130, at step 1114, receives a user's input that instructs the community manager module 140 whether or not to identify areas within the tree 500 where additional inter-community connections should be added to strengthen the tree 500. The control flow exits at step 1116.

Information Processing System

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 12:
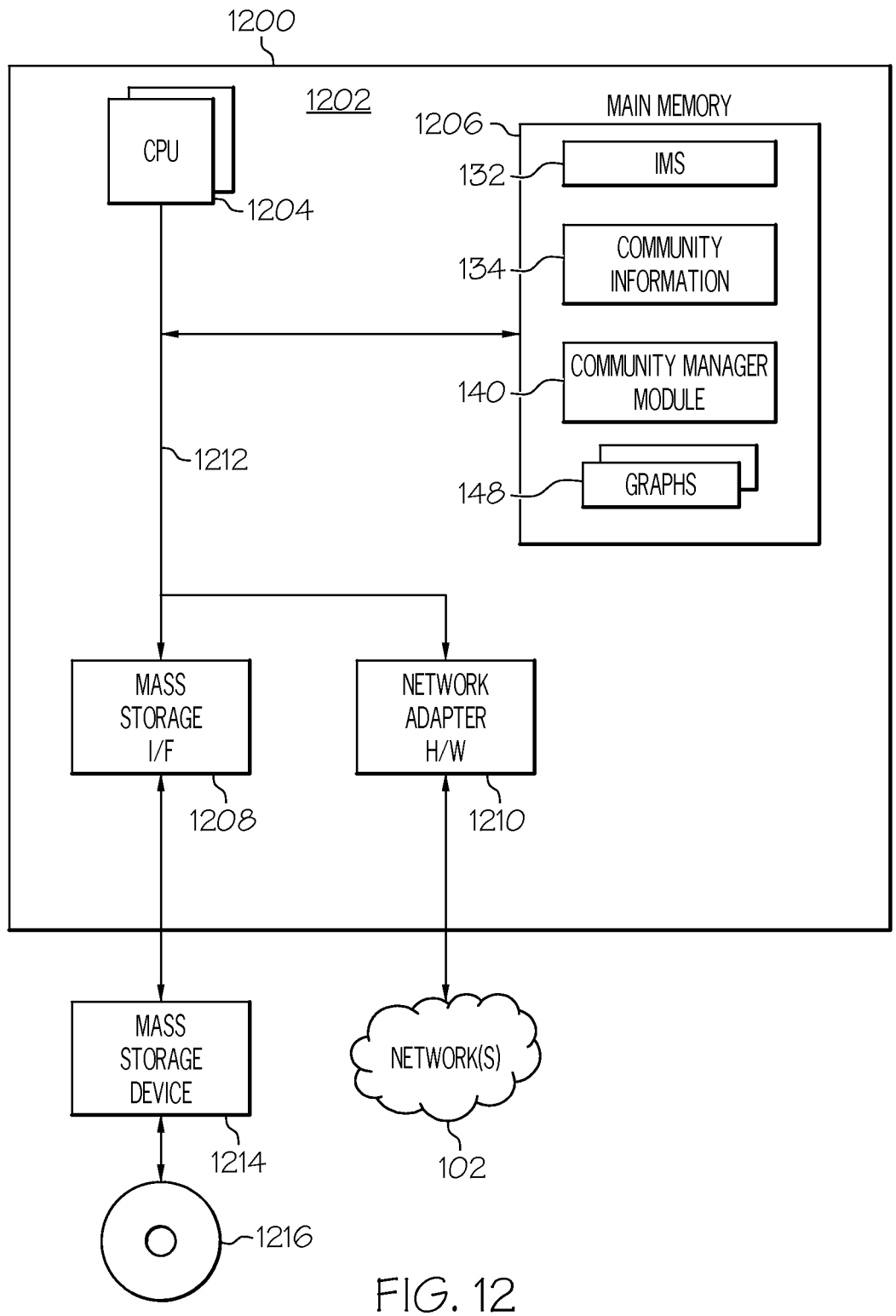
FIG. 12 is a block diagram illustrating a more detailed view of an information processing system according to one embodiment of the present invention.

Referring now to FIG. 12, which is a block diagram illustrating a more detailed view of an information processing system 1200 that can be utilized in the operating environment 100 discussed above with respect to FIG. 1. The information processing system 1200 is based upon a suitably configured processing system adapted to implement one or more embodiments of the present invention. Similarly, any suitably configured processing system can be used as the information processing system 1200 by embodiments of the present invention.

The information processing system 1200 includes a computer 1202. The computer 1202 has a processor(s) 1204 that is connected to a main memory 1206, mass storage interface 1208, and network adapter hardware 1210. A system bus 1212 interconnects these system components. The main memory 1206, in one embodiment, includes the IMS 132, community information 134, the community manager 140, and one or more graphs 148.

Although illustrated as concurrently resident in the main memory 1206, it is clear that respective components of the main memory 1206 are not required to be completely resident in the main memory 1206 at all times or even at the same time. In one embodiment, the information processing system 1200 utilizes conventional virtual addressing mechanisms to allow programs to behave as if they have access to a large, single storage entity, referred to herein as a computer system memory, instead of access to multiple, smaller storage entities such as the main memory 1206 and data storage device 1216. Note that the term "computer system memory" is used herein to generically refer to the entire virtual memory of the information processing system 1206.

The mass storage interface 1208 is used to connect mass storage devices, such as data storage device 1214, to the information processing system 1200. One specific type of data storage device is an optical drive such as a CD/DVD drive, which may be used to store data to and read data from a computer readable medium or storage product such as (but not limited to) a CD/DVD 1216. Another type of data storage device is a data storage device configured to support, for example, NTFS type file system operations.

Although only one CPU 1204 is illustrated for computer 1202, computer systems with multiple CPUs can be used equally effectively. Embodiments of the present invention further incorporate interfaces that each includes separate, fully programmed microprocessors that are used to off-load processing from the CPU 1204. An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 1200. The network adapter hardware 1210 is used to provide an interface to a network 102. Embodiments of the present invention are able to be adapted to work with any data communications connections including present day analog and/or digital techniques or via a future networking mechanism.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for managing connections between a virtual world and a social network, the method comprising:
  executing by a processor residing on an information processing system, the following:
  analyzing a set of virtual world information associated with a virtual world and a set of social network information associated with a social network;
  generating, based on the analyzing, a two-dimensional graph comprising a plurality of vertices, wherein each vertex represents a respective one of virtual world information in the set of virtual world information and social network information in the set of social network information, and wherein each vertex is coupled to at least one other vertex by a respective edge, at least one edge of the graph coupling a first vertex representing virtual world information and a second vertex representing social network information, thereby connecting the virtual world information to the social network information;
  determining, in response to the generating, that at least one vertex in the plurality of vertices is an articulation point having a respective edge, within the two-dimensional graph, wherein the removal of the respective edge of the articulation point causes disconnection of the virtual world information from the social network information within the graph; and
  notifying, via a graphical user interface in response to the determining, a user associated with at least one of the virtual world information and the social network information that the graph comprises the articulation point.

2. The method of claim 1, further comprising:
  graphically displaying, via the graphical user interface in response to the generating, the graph to the user; and
  visually, in response to the notifying, indicating the articulation point to the user.

3. The method of claim 1, further comprising:
  identifying, in response to the determining, a set of vertices that are disconnected from the graph when the articulation point is removed;
  identifying, in response to the identifying, a vertex within the set of vertices that is directly coupled to the articulation point; and
  determining, in response to identifying the vertex within the set of vertices that is directly coupled to the articulation point, that an edge that directly couples the vertex that has been identified with the articulation point is a critical edge that when removed from the graph disconnects the articulation point from the vertex that has been identified.

4. The method of claim 3, further comprising:
  visually, in response to determining that the edge is a critical edge, indicating the critical edge to the user on the graphical user interface.

5. The method of claim 1, wherein graph is generated based on a given interval, wherein the given interval is one of a default interval and an interval set by a user associated with the graph.

6. The method of claim 1, further comprising:
  analyzing, in response to the generating, the plurality of vertices; and
  identifying, based on analyzing the plurality of vertices, a number of connections, wherein each connection couples together a first vertex comprising virtual world information and a second vertex comprising social network information.

7. The method of claim 6, further comprising:
  determining, in response to identifying wherein each connection couples together the first vertex comprising virtual world information and the second vertex comprising social network information, that the number of connections is below a given threshold; and
  notifying, in response to determining that the number of connections is below the given threshold, the user that the number of connections is below the given threshold.

8. The method of claim 1, further comprising:
analyzing, in response to the generating, each vertex in the plurality of vertices; and
identifying, based on analyzing each vertex in the plurality of vertices, a given number of vertices in the plurality of vertices comprising a highest number of at least one of inter-community edges and an intra-community edge, wherein an inter-community edge couples a vertex comprising virtual world information to a vertex comprising social network information, and wherein an intra-community edge couples one of a vertex comprising virtual world information to another vertex comprising virtual world information and a vertex comprising social network information to another vertex comprising social network information.

9. The method of claim 8, further comprising:
indicating, in response to identifying the given number of vertices, to the user to add additional at least one of one or more inter-community edges and one or more intra-community edges at one or more of these given number of vertices.

10. The method of claim 1, wherein the set of virtual world information includes at least a set of virtual world identifiers each associated with a user of the at least one virtual world, and wherein the set of social network information includes at least a set of social network identifiers each associated with a user of the at least one social network.

11. The method of claim 1, wherein the graph comprises at least one vertex comprising virtual world information coupled to at least one vertex comprising social network information, wherein the virtual world information is a virtual world identifier for identifying the user within the virtual world, and wherein the social network information is a social network identifier identifying the user within the social network.

12. The method of claim 1, wherein the determining further comprises at least:
performing a search on the graph.

13. The method of claim 1, wherein notifying the user that that the graph comprises the articulation point further comprises:
notifying, via the graphical user interface, the user by the displaying a message instructing the user to add at least one additional vertex to the graph comprising an edge that connects virtual world information to social network information.

14. An information processing system for managing connections between a virtual world and a social network, the information processing system comprising:
a memory;
a processor communicatively coupled to the memory; and
a community manager module communicatively coupled to the memory and the processor, wherein the community manager module comprises:
a graphing module adapted for:
analyzing a set of virtual world information associated with a virtual world and a set of social network information associated with a social network;
generating, based on the analyzing, a two-dimensional graph comprising a plurality of vertices, wherein each vertex represents a respective one of virtual world information in the set of virtual world information and social network information in the set of social network information, and wherein each vertex is coupled to at least one other vertex by a respective edge, at least one edge of the graph coupling a first vertex representing virtual world information and a second vertex representing social network information, thereby connecting the virtual world information;
an articulation point identifier for:
determining, based on the generating, that at least one vertex in the plurality of vertices is an articulation point having a respective edge within the two-dimensional graph, wherein the removal of the respective edge of the articulation point causes disconnection of the virtual world information from the social network information within the graph; and
a notifier for:
notifying, via a graphical user interface in response to the determining, a user associated with at least one of the virtual world information and the social network information that the graph comprises the articulation point.

15. The information processing system of claim 14, wherein the notifier is further for:
graphically displaying, via the graphical user interface in response to the generating, the graph to the user; and
visually, in response to the notifying, indicating the articulation point to the user.

16. The information processing system of claim 14, wherein the articulation point identifier is further for:
identifying, in response to the determining, a set of vertices that are disconnected from the graph when the articulation point is removed;
identifying, in response to the identifying, a vertex within the set of vertices that is directly coupled to the articulation point; and
determining, in response to identifying the vertex within the set of vertices that is directly coupled to the articulation point, that an edge that directly couples the vertex that has been identified with the articulation point is a critical edge that when removed from the graph disconnects the articulation point from the vertex that has been identified.

17. The information processing system of claim 14, wherein the articulation point identifier is further for:
analyzing, in response to the generating, the plurality of vertices; and
identifying, based on analyzing the plurality of vertices, a number of connections, wherein each connection couples together a first vertex comprising virtual world information and a second vertex comprising social network information;
determining, in response to identifying wherein each connection couples together the first vertex comprising virtual world information and the second vertex comprising social network information, that the number of connections is below a given threshold; and
notifying, in response to determining that the number of connections is below the given threshold, the user that the number of connections is below the given threshold.

18. The information processing system of claim 14, wherein the articulation point identifier is further for:
analyzing, in response to the generating, each vertex in the plurality of vertices; and
identifying, based on analyzing each vertex in the plurality of vertices, a given number of vertices in the plurality of vertices comprising a highest number of at least one of inter-community edges and an intra-community edge, wherein an inter-community edge couples a vertex comprising virtual world information to a vertex comprising social network information, and wherein an intra-community edge couples one of a vertex comprising virtual world information to another vertex comprising virtual world information and a vertex comprising social network information to another vertex comprising social network information, and wherein the notifier is further for:
indicating, in response to identifying the given number of vertices, to the user to add additional at least one of one or more inter-community edges and one or more intra-community edges at one or more of these given number of vertices.

19. A computer program product for managing connections between a virtual world and a social network, the computer program product comprising:
a non-transitory computer readable storage medium having computer readable program code embodied therewith, the computer readable program code configured to perform a method comprising:
analyzing a set of virtual world information associated with a virtual world and a set of social network information associated with a social network;
generating, based on the analyzing, a two-dimensional graph comprising a plurality of vertices, wherein each vertex represents a respective one of virtual world information in the set of virtual world information and social network information in the set of social network information, and wherein each vertex is coupled to at least one other vertex by a respective edge, at least one edge of the graph coupling a first vertex representing virtual world information and a second vertex representing social network information, thereby connecting the virtual world information to the social network information;
determining, based on the generating, that at least one vertex in the plurality of vertices is an articulation point having a respective edge within the two-dimensional graph, wherein the removal of the respective edge of the articulation point causes disconnection of the virtual world information from the social network information within the graph; and
notifying, via a graphical user interface in response to the determining, a user associated with at least one of the virtual world information and the social network information that the graph comprises the articulation point.

20. The computer program product of claim 19, further comprising computer:
analyzing, in response to the generating, the plurality of vertices; and
identifying, based on the plurality of vertices being analyzed, a number of connections, wherein each connection couples together a first vertex comprising virtual world information and a second vertex comprising social network information;
determining, based on the number of connections that have been identified, that the number of connections is below a given threshold; and
notifying, based on the number of connections being below the given threshold, the user that the number of connections is below the given threshold.

21. The computer program product of claim 19, further comprising:
analyzing, in response to generating, the graph, each vertex in the plurality of vertices; and
identifying, based on each vertex in the plurality of vertices being analyzed, a given number of vertices in the plurality of vertices comprising a highest number of at least one of inter-community edges and an intra-community edge, wherein an inter-community edge couples a vertex comprising virtual world information to a vertex comprising social network information, and wherein an intra-community edge couples one of a vertex comprising virtual world information to another vertex comprising virtual world information and a vertex comprising social network information to another vertex comprising social network information.

22. The computer program product of claim 21, further comprising:
indicating, based on the given number of vertices being analyzed, to the user to add additional at least one of one or more inter-community edges and one or more intra-community edges at one or more of these given number of vertices.

* * * * *